US009534585B2

(12) United States Patent
Smith

(10) Patent No.: US 9,534,585 B2
(45) Date of Patent: Jan. 3, 2017

(54) SYSTEM USING NATURAL RESOURCES TO GENERATE ELECTRICITY FROM A PRESSURIZED FLUID

(71) Applicant: Aaron C. Smith, Upland, IN (US)

(72) Inventor: Aaron C. Smith, Upland, IN (US)

( * ) Notice: Subject to any disclaimer, the term of this patent is extended or adjusted under 35 U.S.C. 154(b) by 0 days.

(21) Appl. No.: 14/721,504

(22) Filed: May 26, 2015

(65) Prior Publication Data

US 2015/0345471 A1  Dec. 3, 2015

Related U.S. Application Data

(60) Provisional application No. 62/006,470, filed on Jun. 2, 2014.

(51) Int. Cl.
*F03B 13/00* (2006.01)
*H02P 9/04* (2006.01)
*F03D 9/00* (2016.01)

(52) U.S. Cl.
CPC ............... *F03D 9/001* (2013.01); *F03D 9/17* (2016.05); *Y02E 10/72* (2013.01); *Y02E 60/15* (2013.01)

(58) Field of Classification Search
USPC .................................................. 290/54, 55
See application file for complete search history.

(56) References Cited

U.S. PATENT DOCUMENTS

| 1,061,206 | A | | 5/1913 | Tesla | |
|---|---|---|---|---|---|
| 4,206,608 | A | * | 6/1980 | Bell | F03D 9/007 290/4 R |
| 4,229,661 | A | * | 10/1980 | Mead | F03D 9/17 290/44 |
| 4,236,083 | A | * | 11/1980 | Kenney | F03D 9/17 290/44 |
| 4,447,738 | A | * | 5/1984 | Allison | F03D 9/001 290/44 |
| 7,719,127 | B2 | * | 5/2010 | Bertolotti | F03D 9/17 290/44 |
| 7,777,363 | B2 | * | 8/2010 | Wang | F03D 3/067 290/44 |
| 7,863,767 | B2 | * | 1/2011 | Chapple | F03D 7/02 126/247 |
| 8,896,144 | B2 | * | 11/2014 | Wong | F03D 9/001 290/44 |
| 2005/0275225 | A1 | * | 12/2005 | Bertolotti | F03D 9/17 290/44 |

(Continued)

*Primary Examiner* — Pedro J Cuevas
(74) *Attorney, Agent, or Firm* — Bruce J. Bowman

(57) ABSTRACT

A system is provided for generating electricity from a fluid pressurized via a natural resource such as air compressed through a windmill, the compressed air stored in tanks by a windmill operated compressor, where the stored compressed air is then used to operate a turbine. The turbine has a nozzle configured to increase velocity of the compressed air entering the turbine. The rotor of the turbine has flat annular discs each set apart from one another by spacers to form a rotor stack with no central shaft. Permanent magnets are positioned radially about the end of the rotor stack. The magnets are arranged such that their poles radially alternate to interact with static wire coils positioned about the ends of the rotor stack to produce alternating current electricity. The compressed air enters the turbine at a tangent along the outer periphery of the rotor and exit axially through a central exhaust port.

6 Claims, 19 Drawing Sheets

(56) References Cited

U.S. PATENT DOCUMENTS

| | | | |
|---|---|---|---|
| 2008/0050234 A1* | 2/2008 | Ingersoll | F03D 9/001 416/132 B |
| 2009/0021012 A1* | 1/2009 | Stull | F03D 9/17 290/44 |
| 2009/0230692 A1* | 9/2009 | Lopez | F03D 9/001 290/55 |
| 2010/0109337 A1* | 5/2010 | Wang | F03D 3/067 290/55 |
| 2010/0207452 A1* | 8/2010 | Saab | F03D 1/005 307/65 |
| 2013/0039767 A1* | 2/2013 | Schrickel | F03D 1/005 416/153 |
| 2014/0285005 A1* | 9/2014 | Casteel | H02S 10/40 307/23 |

\* cited by examiner

SYSTEM USING NATURAL RESOURCES TO GENERATE ELECTRICITY FROM A PRESSURIZED FLUID

CROSS-REFERENCE TO RELATED APPLICATIONS

This U.S. non-provisional patent application claims the benefit of and/or priority under 35 U.S.C. §119(e) to U.S. provisional patent application Ser. No. 62/006,470 filed Jun. 2, 2014 titled "Windmill Powered Compressed Fluid Turbine Generator," the entire contents of which is incorporated herein by reference.

FIELD OF THE INVENTION

The present disclosure relates to systems and devices for generating electricity from natural resources and, more particularly, to a system and device for generating electricity from a stored fluid that has been pressurized using an environmentally friendly (green) natural resource.

BACKGROUND

Electricity is almost, if not completely, a necessity in today's society. Homes, businesses, communities and individuals need electricity for powering the devices and infrastructure that run the economy and our lives. In view of this, vast amounts of electricity must therefore be generated on a continuous basis. A lot of that electricity is currently generated using a prime mover or energy source that negatively impacts our environment and/or is not renewable or sustainable. Because of this, there is a growing push towards generating electricity using a prime mover that is environmentally friendly, renewable and sustainable (green). Prime movers such as moving water, wind and solar are considered green.

However, each of these green prime movers has its drawbacks. Because of current solar cell technology, it takes a sizable array of large solar cell panels to generate appreciable amounts of usable electricity. The array is stationary, takes up real estate, and is costly to maintain. It also requires sunshine to generate electricity. Water or hydroelectric systems can generate large amounts of electricity but must be located at the site of the moving or falling water. Such facilities are typically immense structures that may also be associated with a dam and are therefore expensive to operate and maintain. Wind is an excellent prime mover for generating electricity. However, because wind is variable, generating electricity directly from the wind is irregular. On some days, there is little to no wind which translates into little to no generation of electricity, while on other days, there is too much wind creating the possibility of damage to the wind receiving device or the intentional, protective shutdown of the wind receiving device where no electricity is generated. However, wind is arguably the best green energy source for the generation of electricity.

As gathered from the above, it would therefore be desirable to have a wind driven electricity generating system that overcomes the deficiencies of the prior art.

The present invention sufficiently accomplishes these means.

SUMMARY OF THE INVENTION

The present invention is a means for providing a continuous supply of electricity from an abundant green energy source. Particularly, it is a system and apparatus for generating electricity from a natural resource whereby a fluid is pressurized through the energy of the natural resource and stored, and the stored pressurized fluid is utilized to power a turbine that generates electricity. The turbine is thus operated from a steady supply of power from the stored pressurized fluid to provide continuous generation of electricity.

The pressurized fluid is stored in one or more tanks. The tanks may be of any size. As such, the tanks may be relatively permanent in location (typically in conjunction with one or more of the present turbines) or they may be portable. Portable tanks can be transported to a turbine or be provided along with a turbine for generating electricity. Since the present system stores and allows the transportation of the energy (pressurized fluid) to run the turbine, it lends itself for use in a wide range of applications.

In one form, the present system generates electricity from air pressurized or compressed via a windmill and stored in two or more tanks through a windmill operated air compressor/compression system and valve system for filling and discharging the tanks. Pressurized air from the tanks is provided to a turbine according to the present invention which generates alternating current electricity. The amount of pressurized air required to operate a turbine of the present system is less than the average amount of pressurized air being stored by the windmill due to the design of the turbine.

The turbine is a disk type that utilizes surface tension and adhesion of a fluid and has a nozzle configured to increase velocity of the pressured fluid entering the turbine. Each blade of the rotor of the turbine comprises a flat annular disk each set apart from one another by spacers to form a rotor stack with no central shaft. Permanent magnets are positioned radially about the end rotor disks of the rotor stack. The magnets are arranged such that their poles radially alternate to interact with static wire coils positioned about the ends of the rotor stack to produce alternating current electricity. The pressurized fluid enters the turbine at a tangent along the outer periphery of the rotor and exit axially through a central exhaust port.

The nozzle or input to the turbine creates a supersonic flow by providing the proper geometry and fluid pressure consistent with a converging/diverging design such that the fluid exiting the nozzle is supersonic. The supersonic fluid enters the turbine at a tangent on the edge of the rotor assembly and first encounters the spacers between the discs and provides an amount of starting torque. However, the majority of the work is done by the boundary layer surface tension on the faces of the flat discs. The fluid follows a spiral path between disc faces, passing energy into the rotary action of the rotor until it reaches the exhaust opening in the center of the rotor assembly at which point it exits through the exhaust end cap.

The turbine exhaust consists of low pressure, low temperature, and low velocity fluid with almost all of the energy being transferred into the rotor (i.e. rotation). As a result of the fluid entering at a tangent to the periphery of the discs, the rotor will turn with a linear velocity at the edge equal or almost equal to the post nozzle velocity of the fluid (i.e. supersonic). Application of an electrical load to the turbine will however, slow rotor rotation.

An ideal size for the rotor diameter would make the quotient of fluid speed and circumference equal to an angular velocity that does not exceed the rated velocity for the bearings used. For smaller turbines, modern foil bearings are preferred as these bearings are commonly being used in turbo machinery. The ideal running conditions would be to extract a load which slows the rotor to 51% of its unloaded angular velocity. Applying a larger load will tend to stall the turbine.

Using flat discs as rotor blades makes the present turbine more robust and able to handle fluids with particulates, which is not possible with traditional turbines. Being able run on any fluid either by compression as gas or pressurization as incompressible fluids increases the versatility and adds the possibility of use in extreme environments, such as at the bottom of the ocean or on other planets where the available resources may be very different than earth. Wind or a flowing fluid could then be the prime mover.

The present invention thus overcomes drawbacks of the prior art by using a windmill to compress air or other compressible fluid into storage tanks that operates the compressed air/compressible fluid turbine and use less air than is compressed during normal operation to run the turbine. In this way, during times of average or higher wind speeds, a surplus of compressed fluid is stored, and then during times of lower than average wind speeds the surplus is used with the intention of having enough stored fluid to last until the wind speed returns to average, and recharges the tanks.

BRIEF DESCRIPTION OF THE DRAWINGS

The above mentioned and other features of this invention, and the manner of attaining them, will become apparent and the invention itself will be better understood by reference to the following description of forms of the invention taken in conjunction with the accompanying drawings, wherein.

Although the drawings represent forms of various features and components according to the present invention, the drawings are not necessarily to scale and certain features may be enhanced in order to better illustrate and explain the present invention. All exemplifications set out herein are not to be construed as limiting the scope of the invention in any manner.

DETAILED DESCRIPTION

Those of skill in the art will understand that various details of the invention may be changed without departing from the spirit and scope of the invention.

Figure 24:
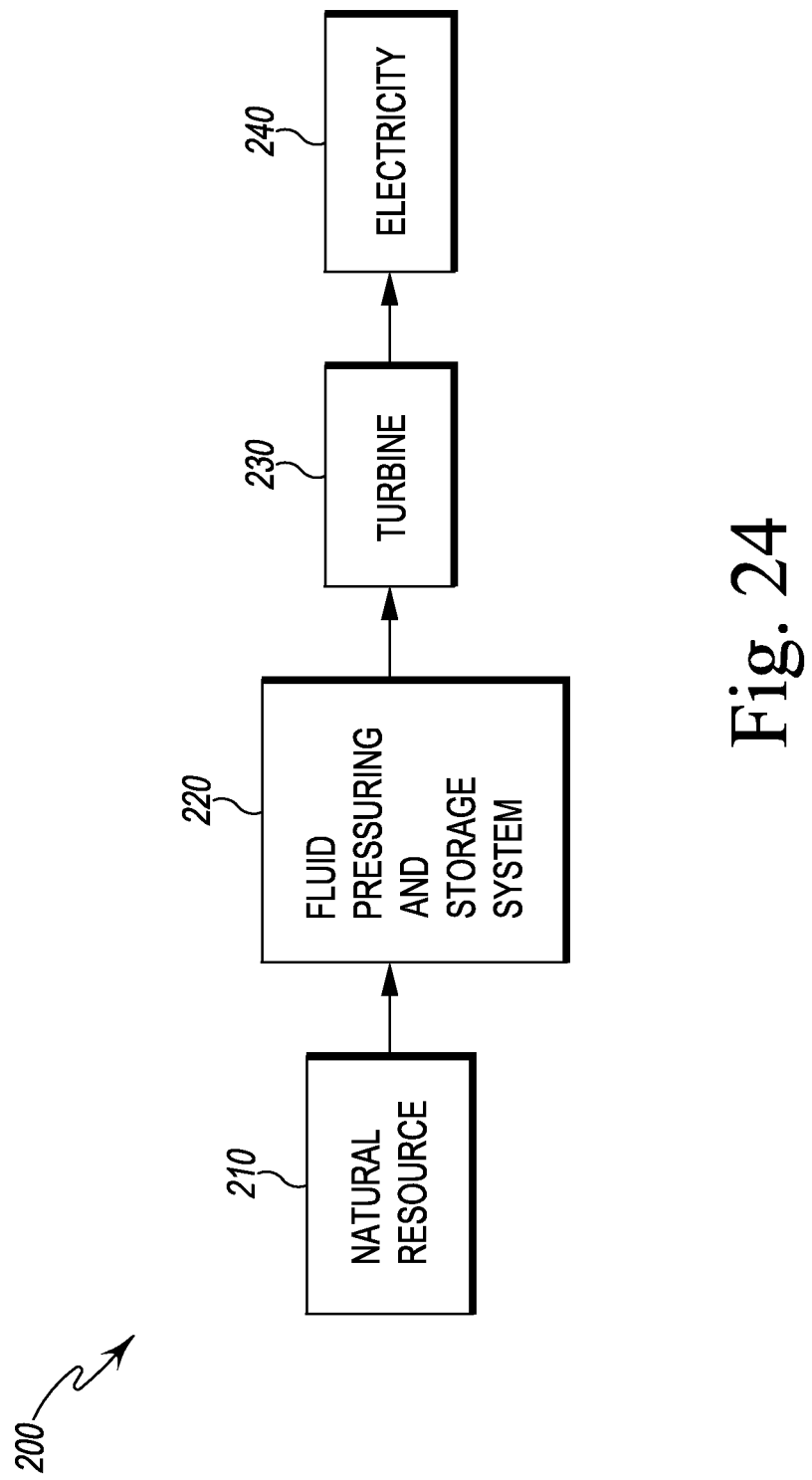
FIG. 24 is a block diagram representation of the present system for generating electricity from a stored fluid pressurized by a natural resource.

FIG. 24 shows a general block diagram 200 of a system for generating electricity per the principles of the present invention, and particularly of using a natural resource to compress or pressurize a fluid, store the compressed or pressurized fluid, then use the stored compressed or pressurized fluid to run a turbine that generates electricity. A natural resource 210 such as wind, water, solar or other is used as a prime mover. The natural resource 210 is coupled to a fluid pressurizing and storage system 220 preferably, but not necessarily, via mechanical means such that the natural resource directly drives the fluid pressuring and storage system 220. The storage system is preferably, but not necessarily, one or more storage tanks. The stored pressurized fluid is provided to a turbine 230, fashioned in accordance with the present principles, which generates electricity 240, the electricity preferably, but not necessarily, being alternating current electricity. While not shown, the output electricity 240 may be connected to appropriate circuitry and/or devices to convert or transform the alternating current electricity as desired.

Figure 25:
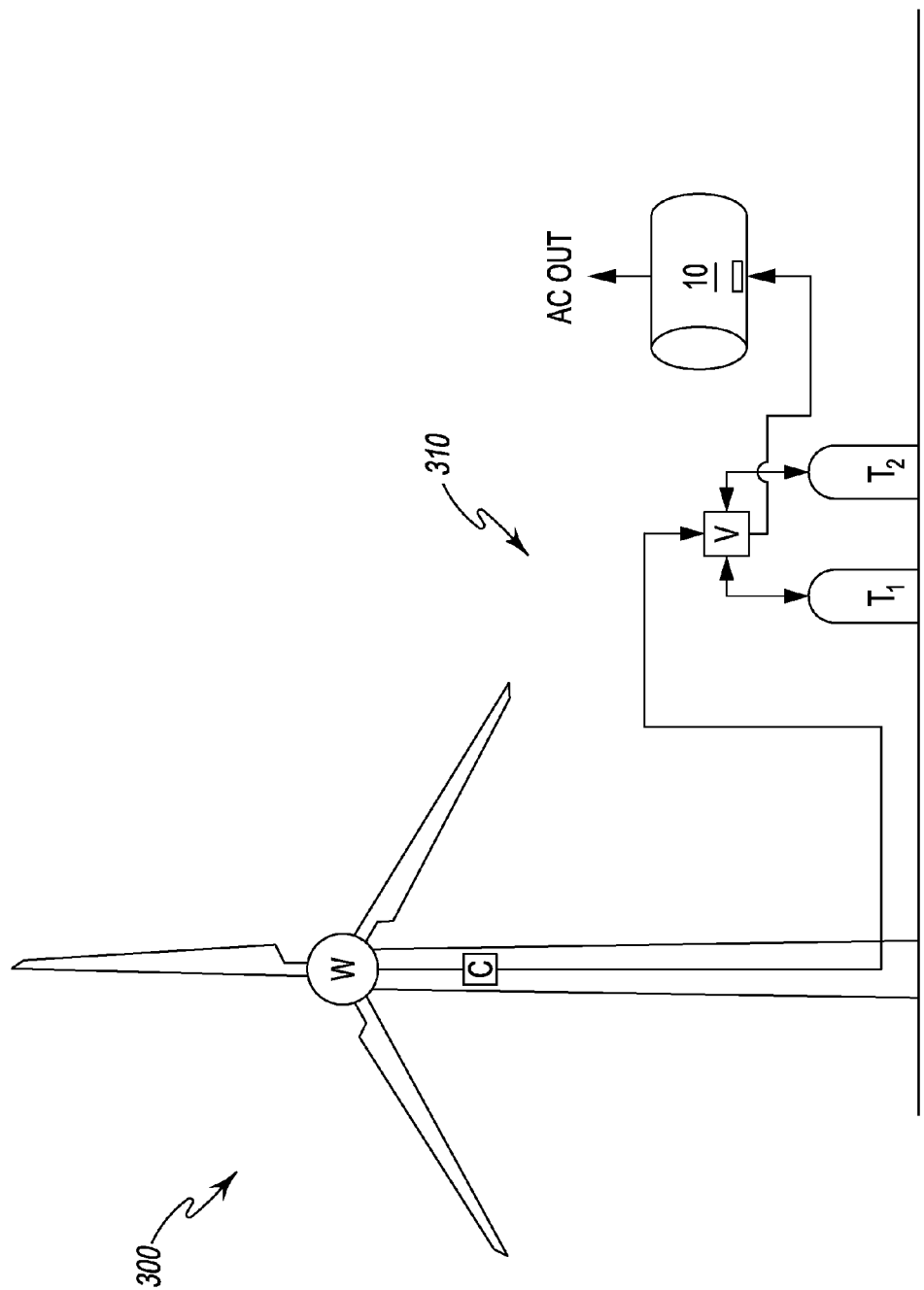
FIG. 25 is an exemplary form of the present system for generating electricity from a stored pressurized fluid using a natural resource as depicted in FIG. 24, the exemplary system using wind to power a windmill that drives an arrangement for compressing air into storage tanks, the compressed air from the storage tanks driving a turbine that creates alternating current electricity.

FIG. 25 depicts an exemplary system 300 for generating alternating current electricity based on the general system 200 depicted in FIG. 24. The system 300 of FIG. 25 uses wind as the natural resource to drive a fluid (air) pressurizing and storage system 310 that drives a turbine 10 which generates or outputs alternating current (AC) electricity AC OUT. The windmill W is mechanically coupled to an air compressor or compression system C of the air pressuring and storage system 310. In one form, the windmill includes a flywheel connected to a knuckle arm to translate rotational motion (rotation) into reciprocating motion (reciprocation). This reciprocation drives a compression piston up and down to compresses air, preferably but not necessarily, on both the upstroke and the down stroke by means of valves and the like such as is known in the art.

The pressurized or compressed air from the compressor/compression system 310 is stored in the tanks T1 and T2. Valve(s) or valve system V provides a regulated and controlled connection between the compressor/compression system and the tanks T1, T2. The turbine 10 is connected to the tanks T1, T2 through the valve(s) V to provide a regulated and controlled supply of pressurized air. Operation of the turbine 10 provides alternating current ACOUT. While not shown, attachment points for inserting, charging (filling), and removing of portable tanks may be optionally provided.

The valve(s) V provides that one tank is charging while the other tank is discharging. If any portable tanks are connected to the air compressor/compression system, they are charged as needed and/or possible. The connections, valves and the like can be regulated and/or controlled by use of pressure sensors, valves and associated any programming as is known in the art. Each tank is fitted with a pressure regulator to ensure consistent pressure in the air supplied to the turbine 10. A preferred pressure is around 175 psi. This pressure is necessary in the choked (converging/diverging) air flow design of the turbine nozzle 26 (see, e.g., FIG. 2) to achieve maximum exit velocity (e.g. a supersonic exit velocity), and thus an adequate turbine input velocity.

The supersonic air received into the turbine 10 through action of the nozzle 26 drives the turbine which is configured to output alternating current electricity ACOUT. As described in greater detail below, the turbine is designed such that the incoming air flow enters the interior of the turbine at a tangent along the outer periphery of the rotor, and exits axially from the turbine through a central exhaust port. The rotor blades of the rotor of the turbine are flat discs that are spaced apart by washers, have no central shaft, and house permanent magnets with radially alternating poles to produce alternating current electricity while the rotor is in motion.

Figure 26:
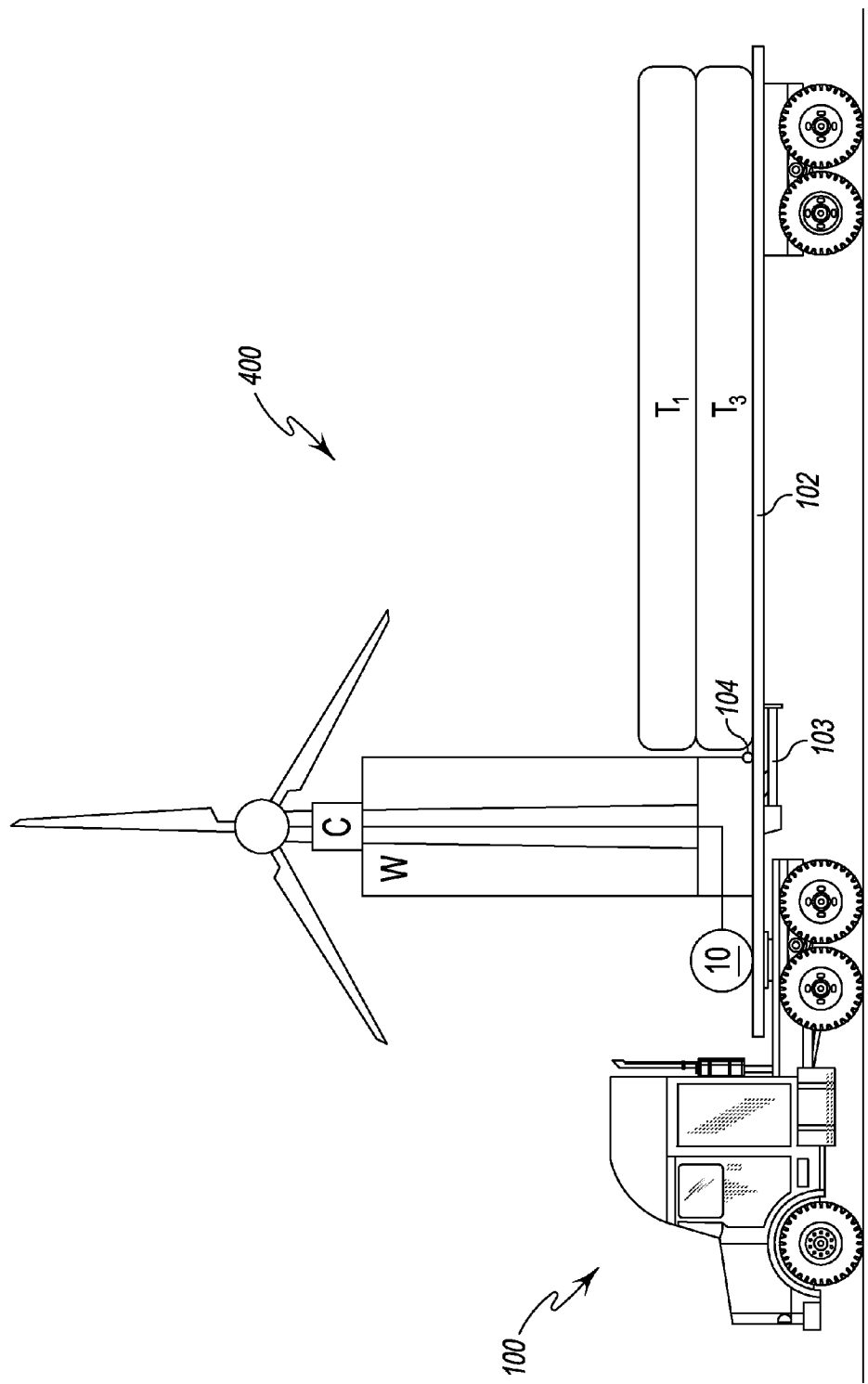
FIG. 26 is an exemplary portable form of the present system for generating electricity from a stored pressurized fluid using a natural resource as depicted in FIG. 24, the exemplary portable system using a truck as a portable platform to carry a wind-powered windmill that drives an arrangement for compressing air into storage tanks carried by the truck, the compressed air from the storage tanks driving a turbine carried by the truck that creates alternating current electricity.
Figure 27:
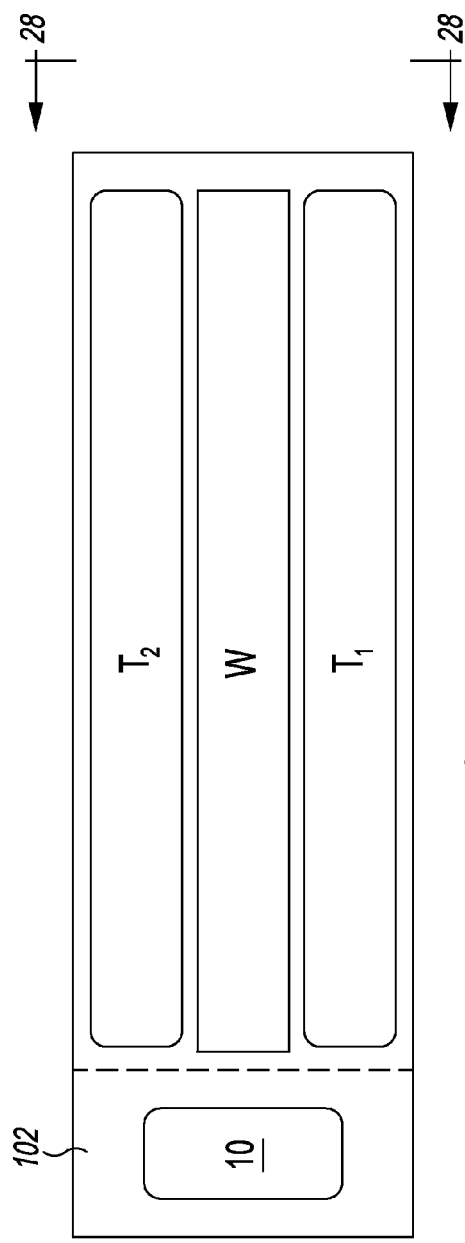
FIG. 27 is a top view of the trailer portion of the exemplary portable system for generating alternating current electricity from a stored pressurized fluid using wind as the natural resource of FIG. 26.
Figure 28:
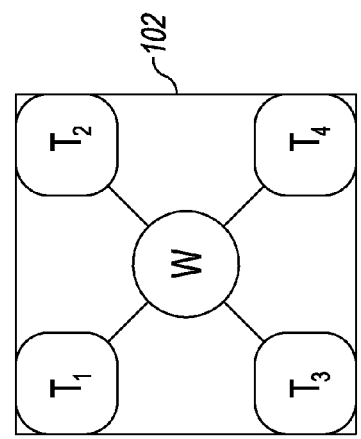
FIG. 28 is an end view of the trailer portion of FIG. 27 taken along line 28-28 thereof.

FIGS. 26-28 depicts an exemplary portable system for generating AC electricity 400 based on the general system 200 depicted in FIG. 24. The portable system 400 uses a truck 100 or other vehicle having a trailer or the like 102 to carry the system components. The system 400 of FIGS. 26-28 uses wind as the natural resource to drive a fluid (air) pressurizing and storage system that then drives a turbine 10 which generates or outputs alternating current (AC) electricity. The windmill W is pivotally coupled at 104 (see FIG. 26) such that the windmill W can be raised into an operating position as shown in FIG. 26, and lowered into a storage position as shown in FIG. 27. The windmill W is mechanically coupled to an air compressor or compression system C, and in one form, includes a flywheel connected to a knuckle arm to translate rotational motion (rotation) into reciprocating motion (reciprocation). This reciprocation drives a compression piston of the compressor C up and down to compresses air, preferably but not necessarily, on both the upstroke and the down stroke by means of valves and the like such as is known in the art.

The pressurized or compressed air from the compressor/compression C is stored in the tanks T1, T2, T3, and T4. The portable system 400 may have more or less tanks as desired. Additionally, the tanks may be configured as desired. Valve(s) (not shown) provides a regulated and controlled connection between the compressor C and the tanks T1, T2. T3, T4. The turbine 10 is connected to the tanks T1, T2, T3, T4 through the valve system to provide a regulated and controlled supply of pressurized air. Operation of the turbine 10 provides alternating current. As shown in FIG. 26, a leg 103 (shown in an up position) may be provided on the trailer 102 which, when in the down position (not shown) aids in maintaining stability of the trailer 102 during operation.

The valve(s) V provides that the additional tanks are charging while one tank is discharging into the turbine 10. The connections, valves and the like can be regulated and/or controlled by use of pressure sensors, valves and associated any programming as is known in the art. Each tank is fitted with a pressure regulator to ensure consistent pressure in the air supplied to the turbine 10. A preferred pressure is around 175 psi. This pressure is necessary in the choked (converging/diverging) air flow design of the turbine nozzle 26 (see, e.g., FIG. 2) to achieve maximum exit velocity (e.g. a supersonic exit velocity), and thus an adequate turbine input velocity.

The windmill W may be pivotally coupled at 104 to the trailer 102 in order to raise and lower the windmill W. FIG. 26 shows the windmill W in the raised position ready for use, while FIG. 27 shows in the lowered position for storing and transporting. Other manners are contemplated such as telescoping arms and the like.

Figure 1:
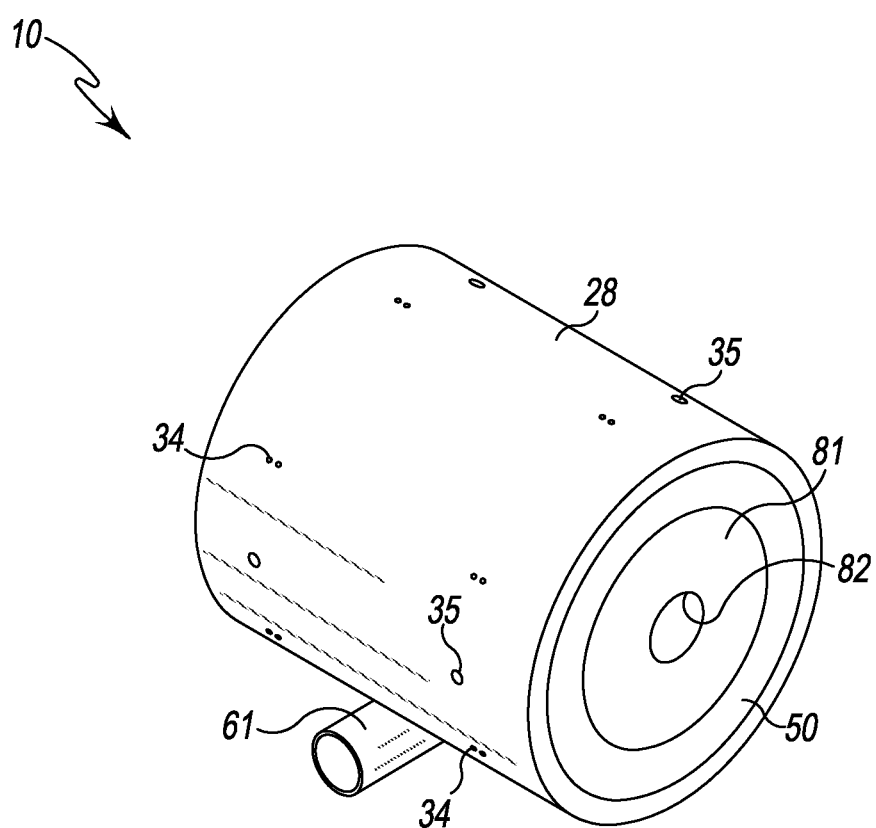
FIG. 1 is a view of a turbine that can be used in the present system for generating alternating current electricity from a stored fluid pressurized by a natural resource.
Figure 2:
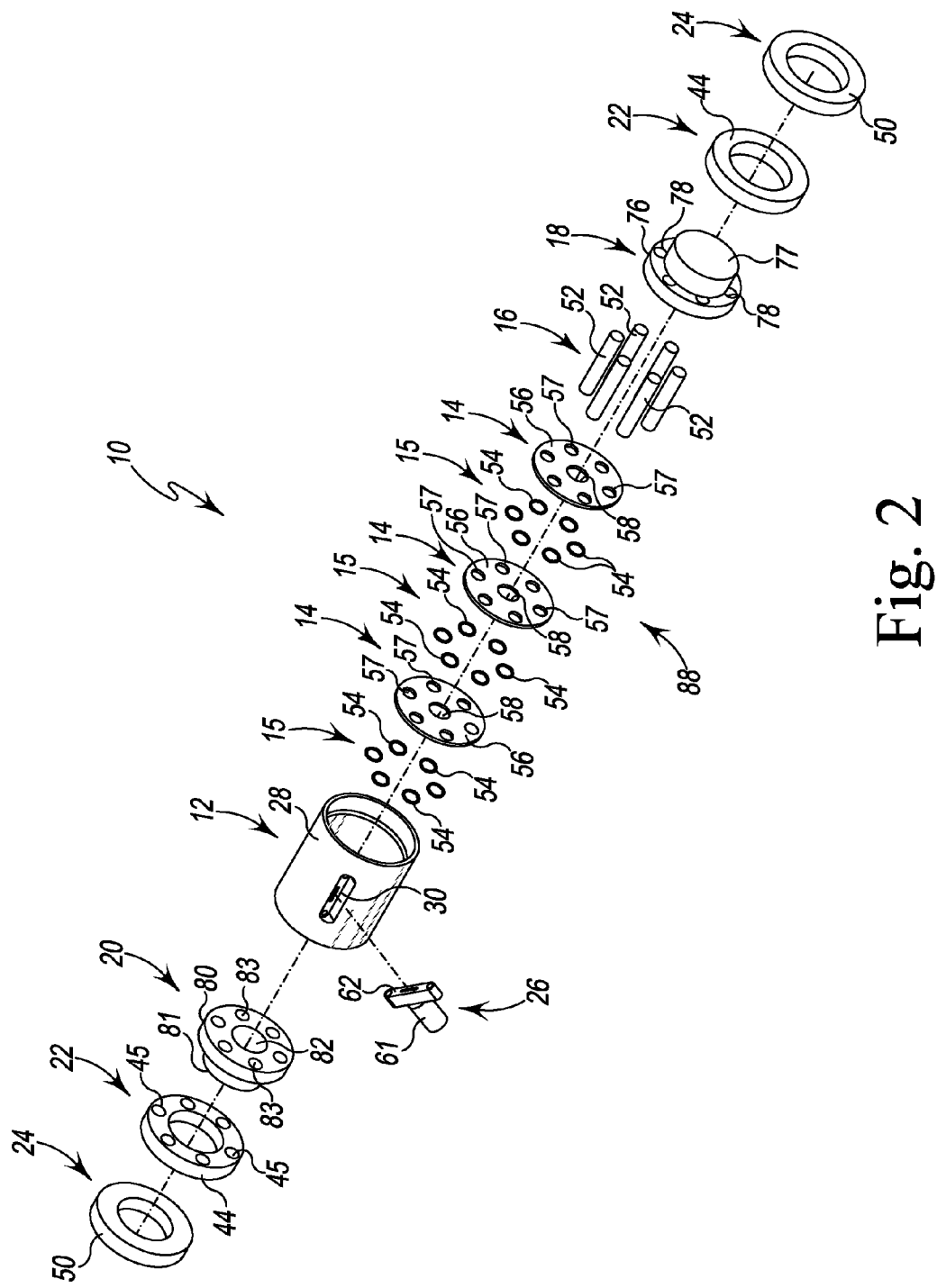
FIG. 2 is an exploded view of the turbine of FIG. 1.

Referring now to FIGS. 1-7, there is depicted an exemplary form of a turbine, generally designated 10, for generating alternating current electricity from a pressurized fluid such as, but not limited to, compressed air, that is fashioned in accordance with the present principles and usable with the present electricity generating systems. With particular reference to FIG. 2, the turbine 10 generally has the nozzle 26, a housing 12 that holds a rotor assembly with a disc stack 88 as part of the rotor assembly, end caps 18, 20, coils housings 22, and bearings 24. Wiring (not shown) is connected to the turbine 10 as described below for outputting the alternating current electricity from the turbine 10.

Figure 7:
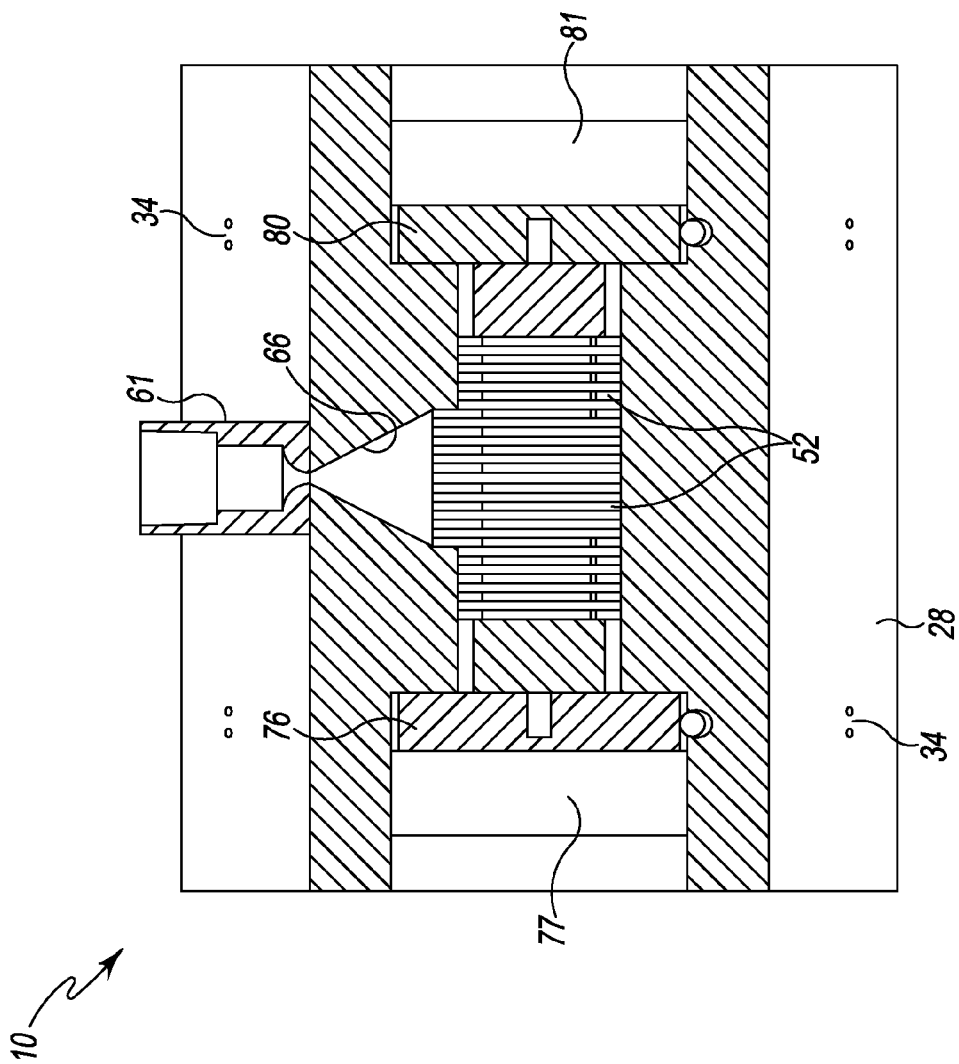
FIG. 7 is a sectional view of the turbine of FIG. 4 taken along line 7-7 thereof.
Figure 8:
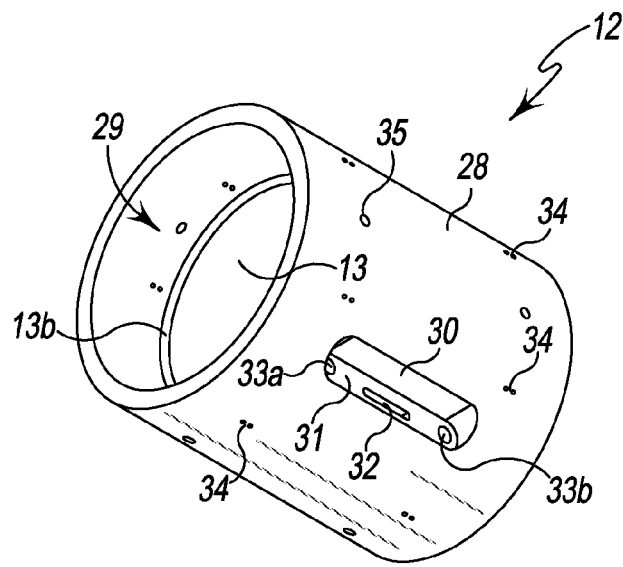
FIG. 8 is a view of the housing of the turbine of FIG. 1.
Figure 9:
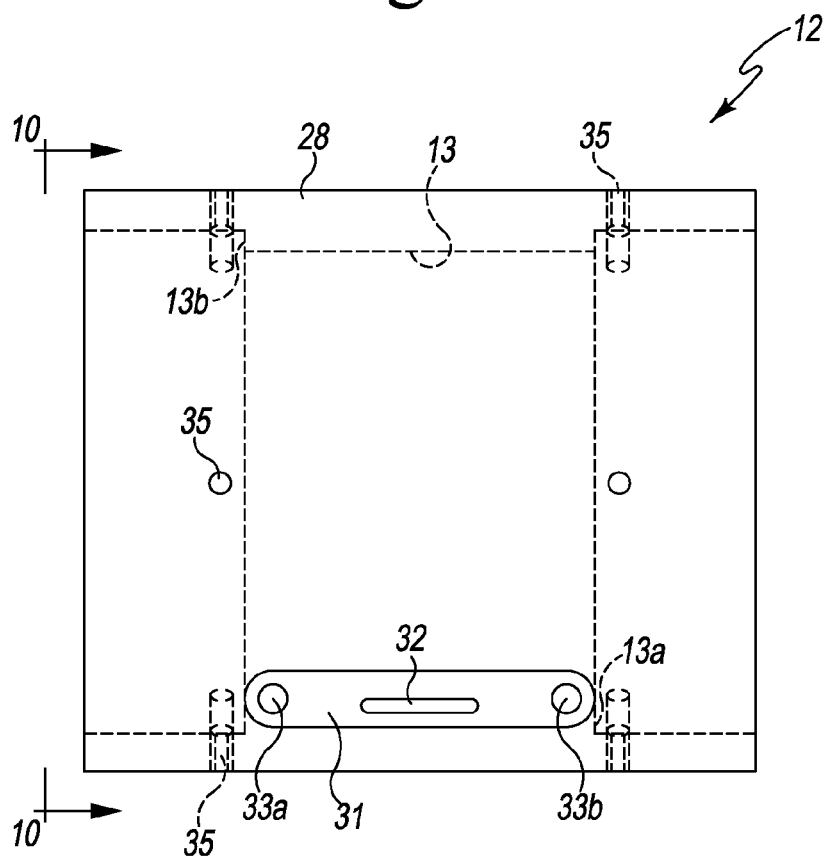
FIG. 9 is a side view of the housing of FIG. 8.
Figure 10:
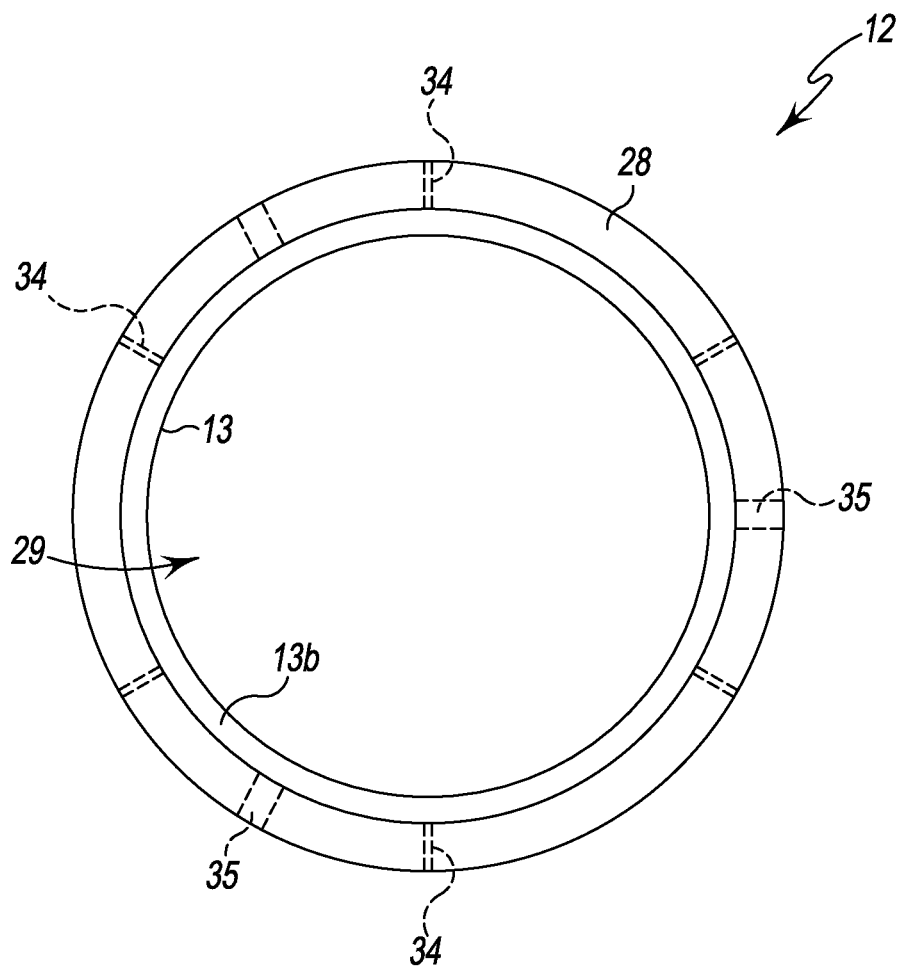
FIG. 10 is an end view of the housing of FIG. 8 taken along line 10-10 thereof.
Figure 11:
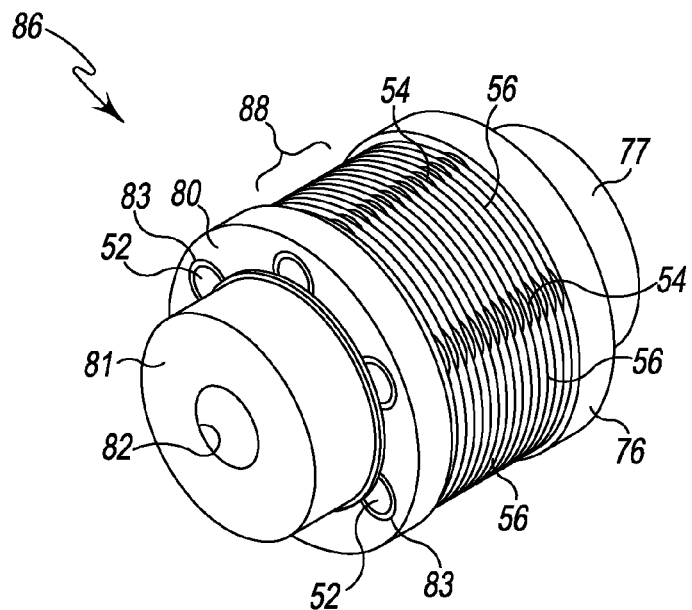
FIG. 11 is a view of the rotor assembly of the turbine of FIG. 1.
Figure 12:
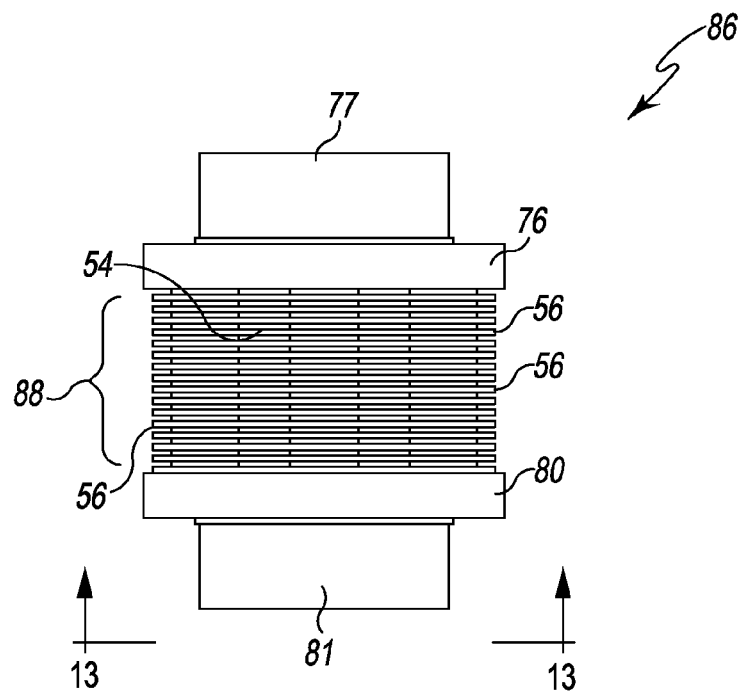
FIG. 12 is a side view of the rotor assembly of FIG. 11.
Figure 13:
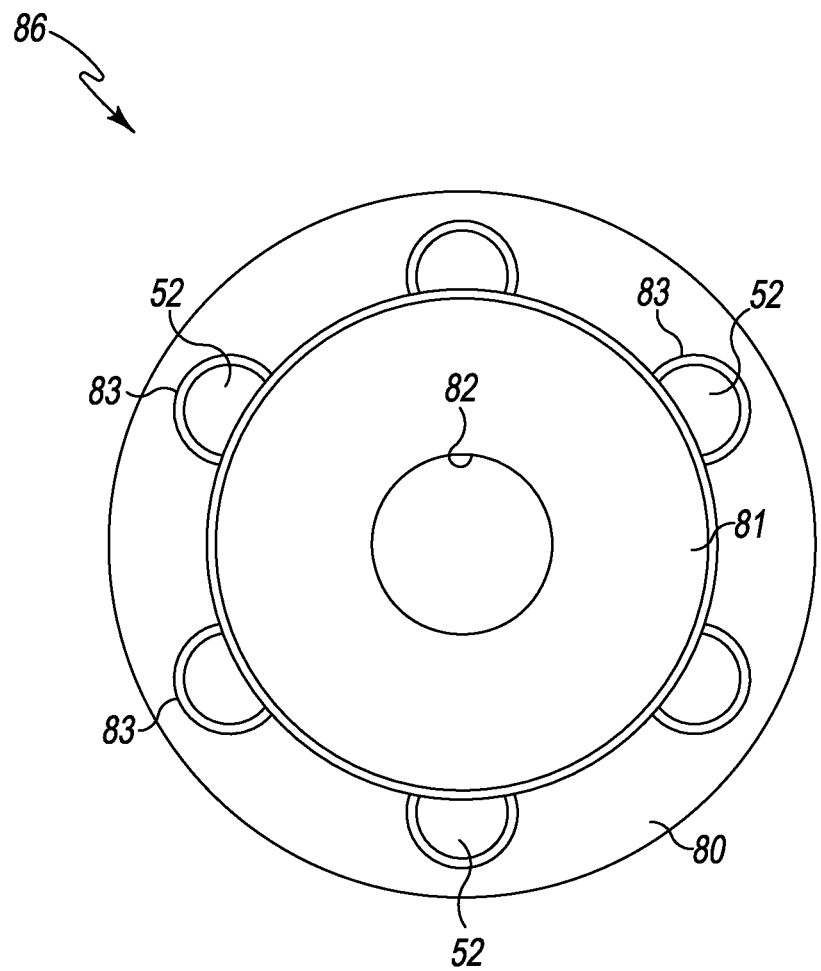
FIG. 13 is an end view of the rotor assembly of FIG. 12 taken along line 13-13 thereof.

Referring additionally to FIGS. 8-10, the housing 12 is more particularly shown. The housing 12 is characterized by a generally cylindrical body 28 having a generally cylindrical interior 29 with an inner annular ledge 13 defining a smaller diameter interior for the rotor. The ledge 13 also defines a first wall 13a on one side of the ledge 13, and a second wall 13b on the other side of the ledge 13, the ledges 13a, 13b providing a seat or stop for the coil housings 22 (see e.g., FIGS. 6-7, 9). A plurality of wire holes 34 are arranged about the body 28 to allow wires from wire coils 38 (see e.g., FIG. 17) as held by the coil housings 22 (see e.g., FIGS. 14-16). In view of this, the wire holes 34 are arranged in two rings about the circumference of the body 28 corresponding to where the two coil housings 22 are situated in the interior 29 of the body 28. The body 28 further has a plurality of bores 35 arranged about the same two rings about the circumference of the body 28. The bores are situated to align with bores 47 of the coil housing 22 (see e.g., FIGS. 5, 14-16). Pins or the like (not shown) received in the bores 35, 47 fix the coil housings 22 to the body 28 which hold the end caps 18, 20 of the rotor assembly, and thus the rotor within the body 28 (see e.g., FIGS. 5-7).

The body 28 further includes a notch 30 in the outside circumference of the body 28. The notch 30 defines an elongated flat or seat 31 having an oval bore 32 that provides communication between outside the body 28 and the interior 29 of the body 28. A gasket (not shown) is preferably provided on the flat 31 in conjunction with the nozzle 26. Two screw bores 33a, 33b are also disposed in the flat 31. The notch 30 is configured to receive the nozzle 26 and allow it to be attached thereto by screws (not shown) via the screw bores 33a, 33b.

Figure 18:
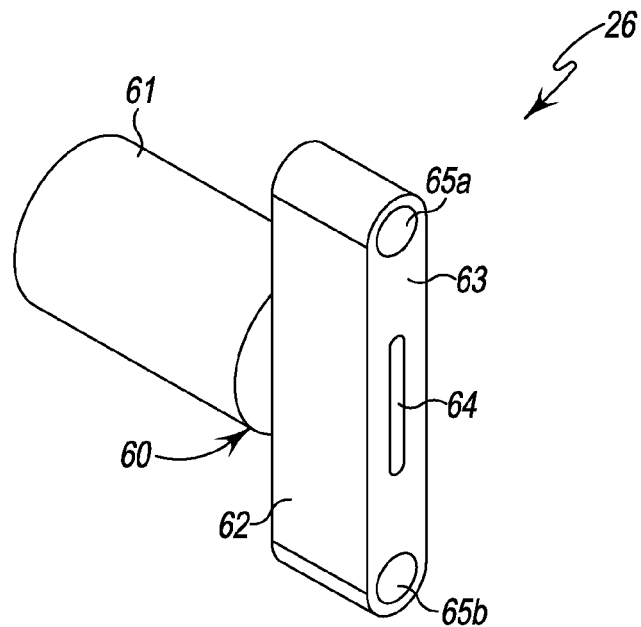
FIG. 18 is a view of the nozzle of the turbine of FIG. 1.
Figure 19:
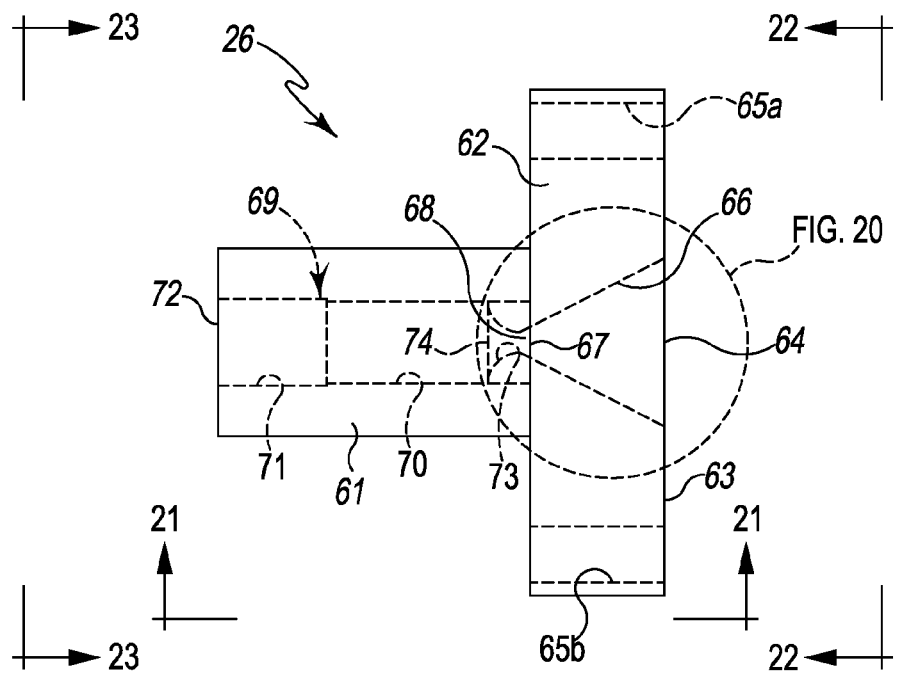
FIG. 19 is a side view of the nozzle of FIG. 8.

Referring to FIGS. 18-23, an exemplary form of the present nozzle 26 will be described. As indicated, the nozzle 26 is configured to receive the incoming compressed or pressurized fluid at a first velocity and output the fluid at a second velocity that is greater than the first velocity and, preferably, at a supersonic velocity. The nozzle 26 may consist of flat plates pressed or sandwiched together having progressively changing dimensions or it may be machined. As generally shown in FIG. 18, the nozzle 26 is defined by a body 60 having an inlet conduit 61 and an outlet head 62. The inlet conduit 61 is shown as cylindrical but may take other shapes as desired, as well as incorporate typical coupling means (not shown). The outlet head 62 is shaped for reception by the notch 30 of the housing body 28 and onto the flat 31 thereof.

Figure 20:
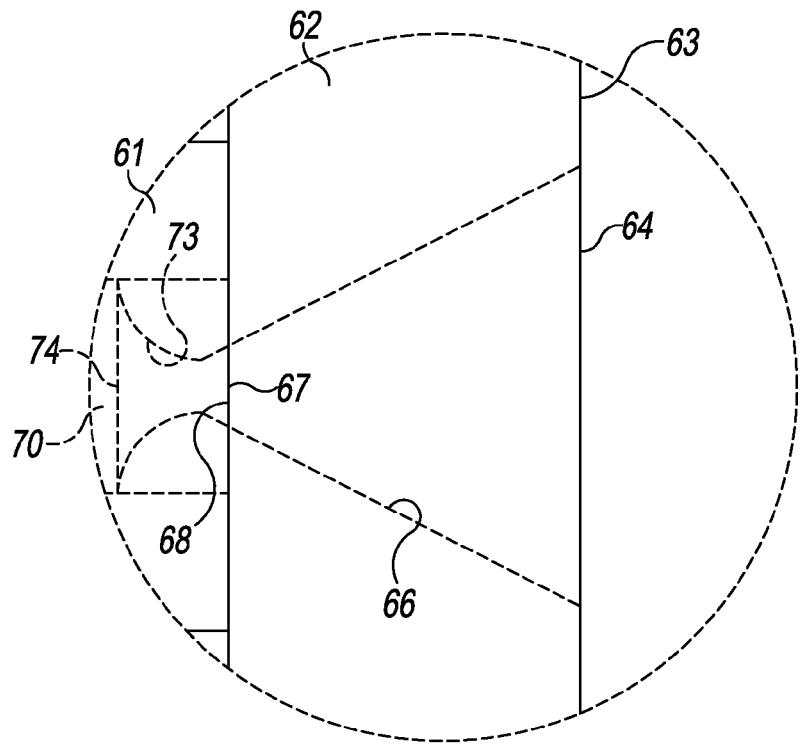
FIG. 20 is an enlarged view of the nozzle of FIG. 19 taken along circle 20 thereof particularly showing the configuration of the orifice of the nozzle.
Figure 21:
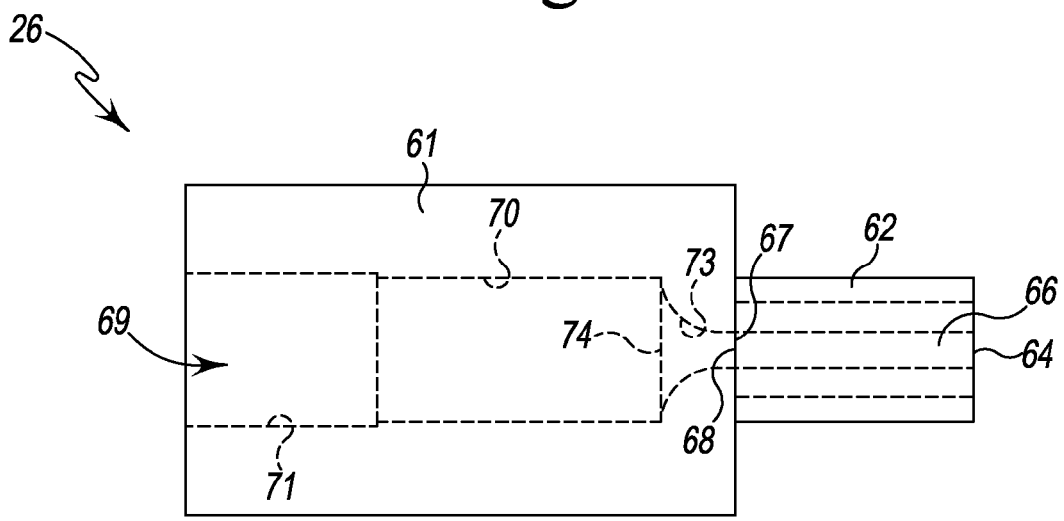
FIG. 21 is a side view of the nozzle of FIG. 19 taken along line 21-21 thereof particularly illustrating its internal configuration.
Figure 22:
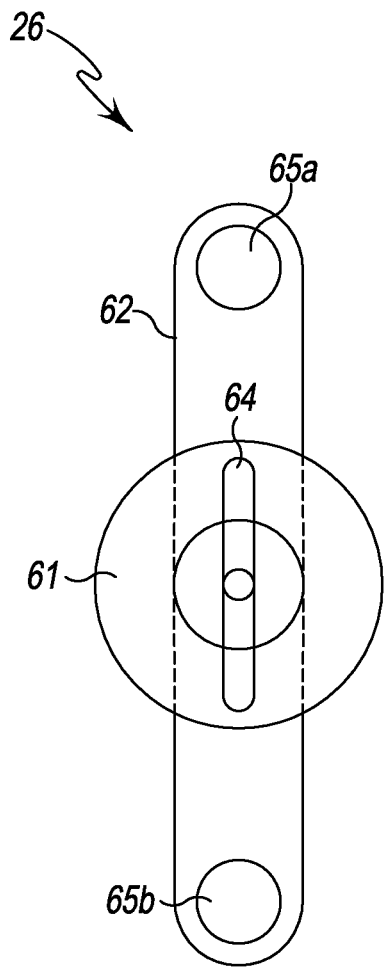
FIG. 22 is an end view of the nozzle of FIG. 19 taken along line 22-22 thereof.
Figure 23:
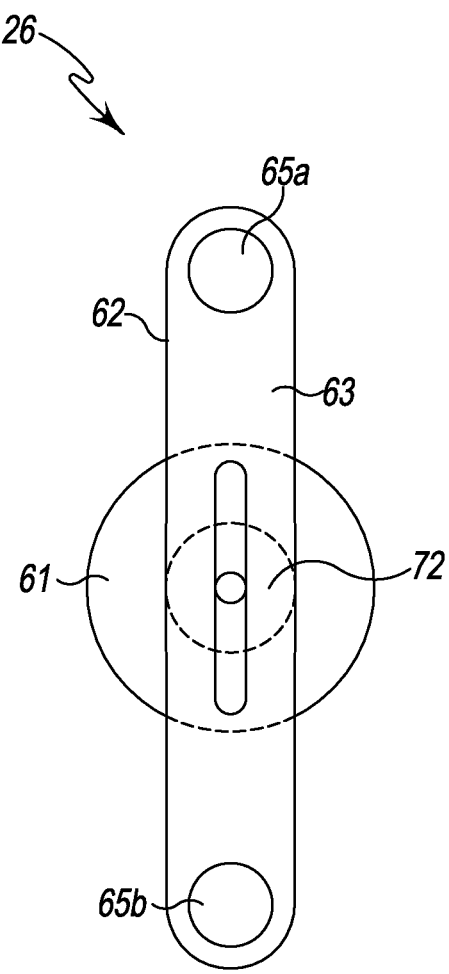
FIG. 23 is an end view of the nozzle of FIG. 19 taken along line 23-23 thereof.

The inlet conduit 61 has an internal bore 69 that defines an inlet 72 and an outlet 68. The bore 69 has a first diameter 71 at the inlet 72 and a second, smaller diameter 70 at the end of the length of the first diameter 71 distal the inlet 72. An end 74 of the length of the second diameter distal the end of the length of the first diameter 71 forms an inlet into a conical or trumpet shaped bore 73 that provides a quick reduction in bore diameter that then has a slightly enlarged diameter outlet 68. This provides a convergence or a converging structure/feature for fluid flow. As best seen in FIG. 20, the outlet 68 abuts an inlet 67 of a bore 66 of the outlet head 62. The inlet 67 is of the same or similar diameter and shape as that of the outlet 68. The bore 66 widens greatly between its inlet 67 and its oval outlet 64. The oval outlet 64 is sized to correspond with the oval inlet 32 of the notch 30 of the housing body 28. This provides a divergence or a diverging structure/feature for fluid flow. The convergence/divergence structure/feature provides a supersonic fluid flow output from a subsonic fluid flow input.

Figure 6:
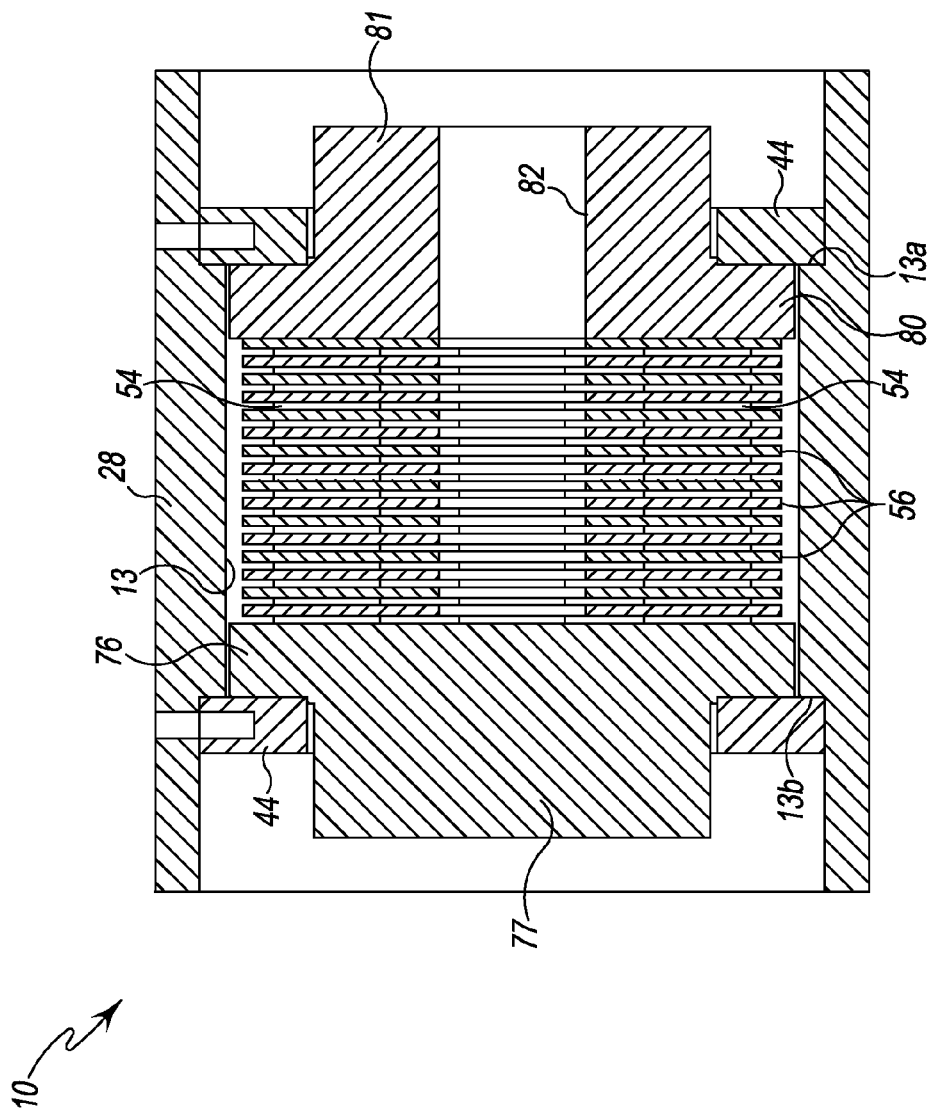
FIG. 6 is a sectional view of the turbine of FIG. 4 taken along line 6-6 thereof.

The rotor is an assembly 86 whose components are best described with reference to FIGS. 2, 6-7, and 11-13. The rotor assembly 86 includes the disc stack 88 consisting of a plurality of discs (or disks) 14 (three discs of which are shown in FIG. 2 as a representation of a greater plurality of discs 14 as seen in FIGS. 6 and 7) of the turbine 10, and spacer sets 15 of washers 54 that are disposed between the discs 14 (three spacer sets 15 of which are shown in FIG. 2 as a representation of a greater plurality of spacer sets 15 according to the number of discs 14 as seen in FIGS. 6 and 7). The discs 14 and washers 54 are held by magnet casings 16 consisting of a plurality of tubes, shafts, or rods 52 housing one or more magnets, particularly, but not necessarily, at the ends thereof.

Each rotor disc 14 includes a plurality of holes 57 situated radially about a center hole 58. While six radial holes 57 are shown, corresponding to the six magnet tubes 52 of the magnet casings 16, more or less radial holes may be used. The magnet tubes 52 are thus situated in the radial holes 57 of the discs 14 and extend along the disc stack of the rotor. The center holes 58 of the discs 14 align to form an exhaust opening for the operating fluid. As best seen in FIG. 6, the center holes 58 of the discs 14 align with a central bore 82 of the exhaust end cap 20 to create an exhaust exit for the operating fluid. The other end cap 18 does not include a central bore.

The disc stack 88 is held together by the magnet tubes 52 that are received at one end by the end cap 18 and received at the other end by the end cap 20 such as seen in FIGS. 2, 6, and 11-13. The end cap 18 includes a disk-shaped body 76 having a central hub 77. A plurality of bores 78 are situated in the body 76 radially about the central hub 77, the number of bores 78 corresponding to the number of magnet tubes 52. The end cap 20 includes a disk-shaped body 80 having a central hub 81 with a central bore 82. The central bore 82 provides a fluid exhaust port or outlet for the turbine. A plurality of bores 83 are situated in the body 80 radially about the central hub 81, the number of bores 83 corresponding to the number of magnet tubes 52. The rotor assembly 86 is received within the interior 29 of the housing body 28 as seen in FIGS. 6 and 7, and is fixed therein for rotation relative to the housing body 28 as described below.

Figure 14:
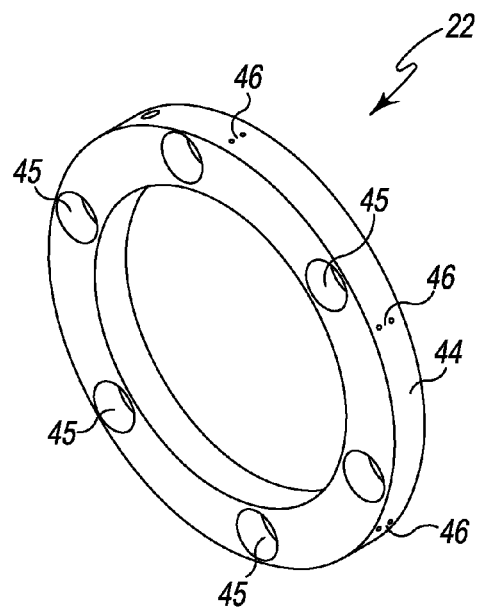
FIG. 14 is a view of one of the coil housings of the turbine of FIG. 1.
Figure 15:
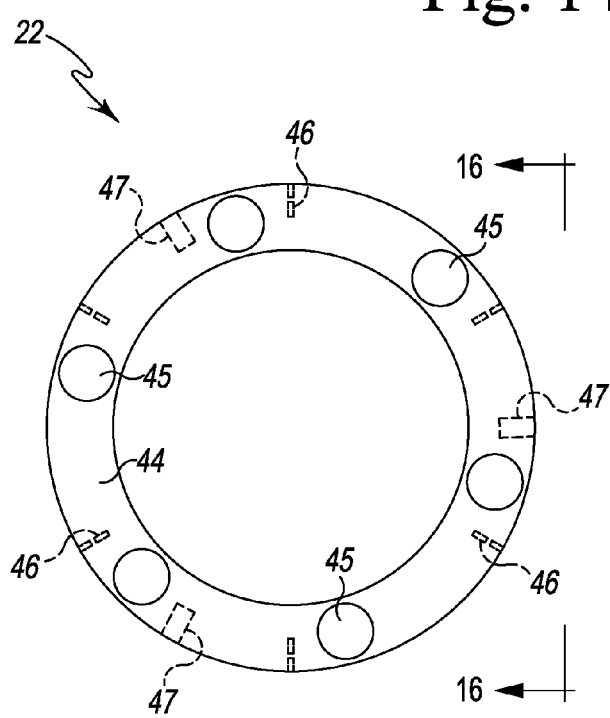
FIG. 15 is an end view of the coil housing of FIG. 14.
Figure 16:
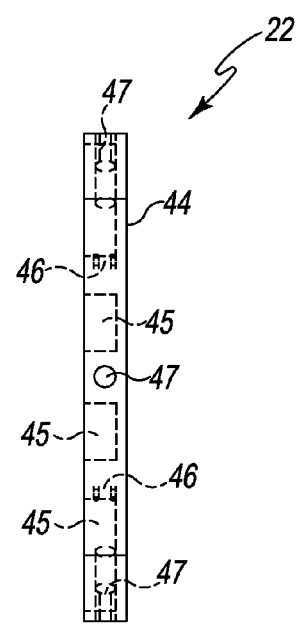
FIG. 16 is a side view of the coil housing of FIG. 15 taken along line 16-16 thereof.
Figure 17:
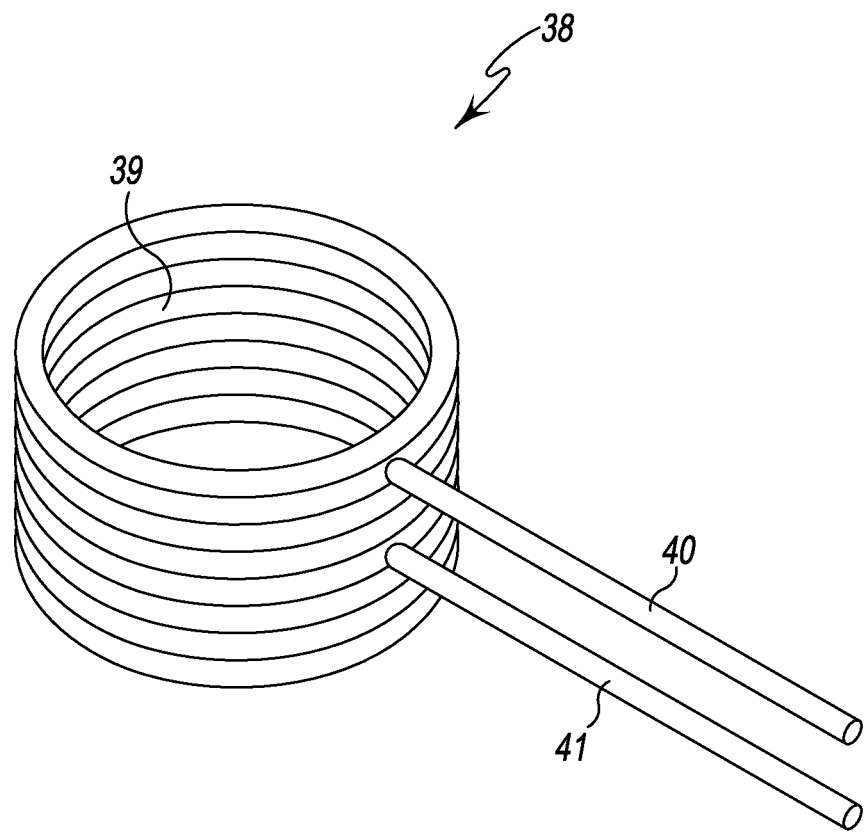
FIG. 17 is a view of a wire coil of the turbine of FIG. 1.

The rotor assembly 86 is retained in the housing body 28 by two coils housings 22, one coils housing 22 situated at one end of the rotor assembly 86, and the other coils housing 22 situated at the other end of the rotor assembly 86, the two coils housings 22 being identical. Referring to FIGS. 14-16, a coils housing 22 is particularly shown. The coils housing 22 is characterized by an annular or ring-shaped body 44 having a plurality of bores 45 about the radial circumference of the body 44. The bores 45 are sized to receive a wire coil 38 (see FIG. 17), the wire coil 38 characterized by a number of turns 39 of a wire with first and second leads 40, 41 connected to the ends of the turns 39. A plurality of two-wire ports 46 is also provided in the body 44, the number of which corresponds to the number of coil bores 45. Each two-wire port 46 is in communication with a coil bore 45 such that the leads 40, 41 of the wire coil 38 situated in the coil bore 45 extend through the ports 46 and then out the ports 34 of the housing body 28. The coils housings 22 are affixed to the housing body 28 by pins extending through the bores 35 of the housing body 28 and the bores 47 of the coils housing body 44 (see, e.g., FIG. 7).

Figure 3:
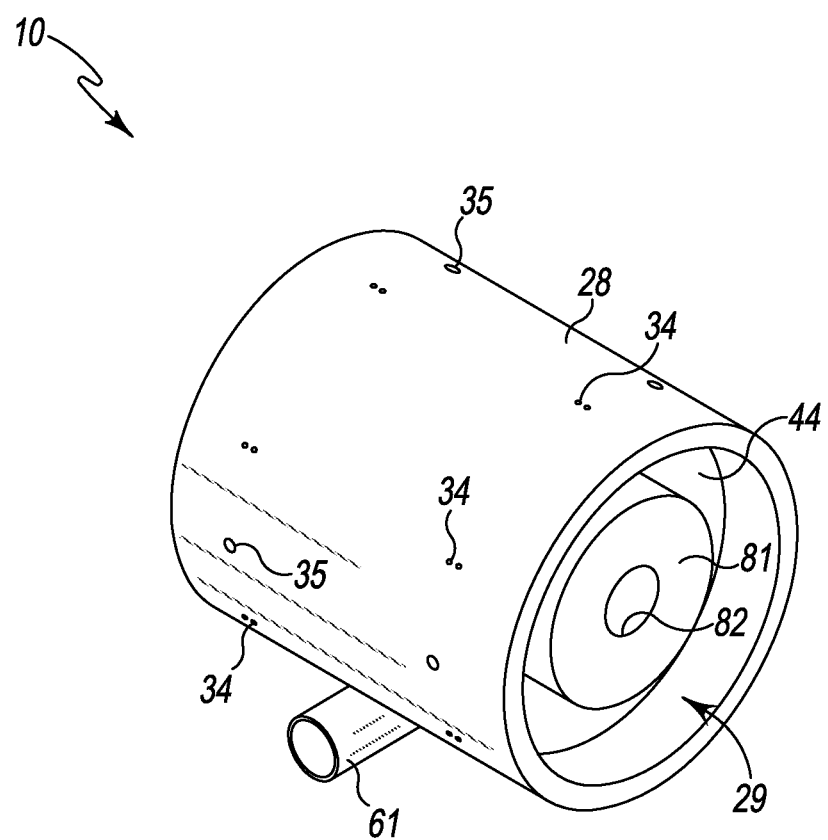
FIG. 3 is a view of the turbine of FIG. 1 with an end bearing removed.
Figure 4:
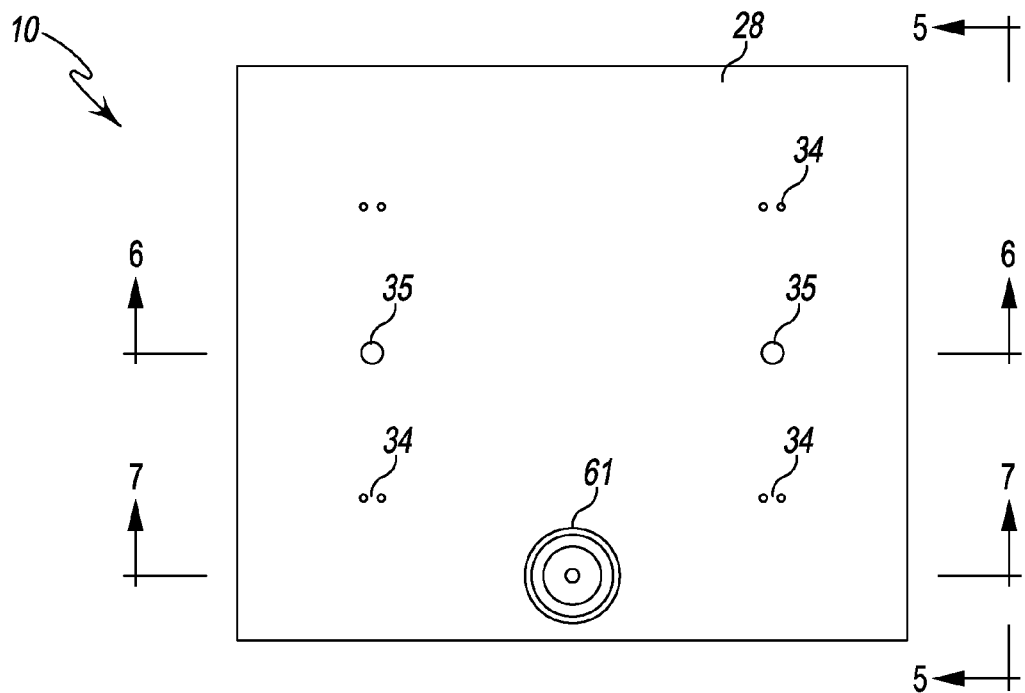
FIG. 4 is an enlarged side view of the turbine of FIG. 1.
Figure 5:
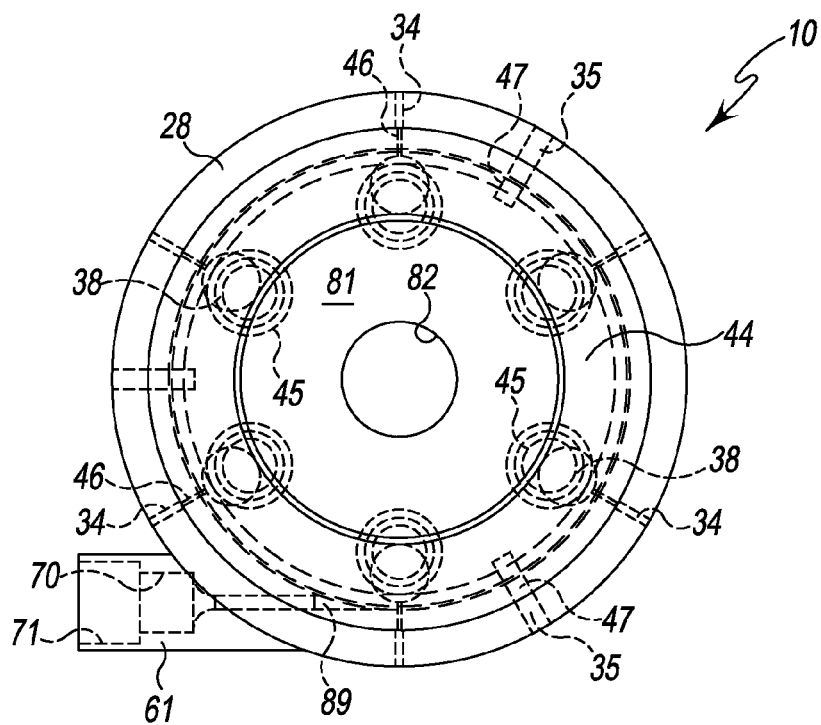
FIG. 5 is an end view of the turbine of FIG. 4 taken along line 5-5 of FIG. 4, the view illustrating wire coils situated in coil bores of a coil housing of the present turbine.

The rotor assembly 86 is situated in the housing body 28 and the coils housings 22 are fixed to the housing body 28. Annular or ring-shaped bearing 50 are then situated at the ends to provide a bearing for the hubs 77 and 81 of the end caps 18, 20. FIG. 1 shows the turbine 10 with an annular bearing 50 on the front facing end of the turbine, while FIG. 3 shows the front facing end without an annular bearing 50, providing a look into placement of the rotor assembly 86 within the interior 29 of the housing body 28.

The turbine 10 outputs alternating current electricity in the following manner. There are two sets of wire (pickup) coils 38 radially fixed in position relative to the housing body 28 and within its interior 29, with one radial series of wire coils near one end of the housing body 28, and one radial series of wire coils near the other end of the housing body 28. The rotor assembly 86 has a plurality of tubes 52 each having one or more magnets such that each tube end has one pole of a magnet, the magnets arranged such that magnetic poles alternate radially. As the rotor assembly 86 rotates through use of the compressed air, the magnets of the tubes 52 rotate with the hubs 18, 20. As the hubs 18, 20 rotate adjacent the coils housings 22, the movement of the magnets over the wire coils 38 of the coils housings induce a flow of electricity in the wire coils. This flow of electricity is obtained through the wire coil leads 40, 41. When properly connected, the wire coils of each coils housing supplies its share of electricity.

The output from the turbine is high frequency, high voltage, low amperage alternating current electricity. This electricity can be easily converted to usable power by means of a transformer to produce a proper voltage and amperage as needed. It may be further transformed by a full wave bridge rectifier to produce smooth direct current (DC) electricity. An inverter may also be used to then produce desired frequency with the option of using a grid monitoring system.

While the system has been illustrated and described in detail in the foregoing drawings and description, the same is to be considered as illustrative and not restrictive in character, it being understood that only illustrative forms thereof have been show and described and that all changes and modifications that are within the scope of the following claims are desired to be protected.

For example, it is expected that the system may use water or solar as the natural resource. It may also be another source not yet realized or currently underutilized. The fluid to be pressurized and stored in tanks may be water or any other liquid. Various gasses may also be pressurized, stored and used. Contemplated variations are many.

All references cited in this specification are incorporated herein by reference to the extent that they supplement, explain, provide a background for or teach methodology or techniques employed herein.

What is claimed is:

1. A turbine for generating electricity from a pressurized fluid, the turbine comprising:
    a generally cylindrical housing defining a generally cylindrical hollow interior, and a housing opening in the side thereof;
    a nozzle having a nozzle inlet configured to receive a pressurized fluid stored in a tank, and a nozzle outlet in communication with the housing opening;
    a rotor assembly situated for rotation inside the generally cylindrical hollow interior of the generally cylindrical housing, the rotor assembly having:
        a plurality of discs each disc having a central opening and a plurality of radially spaced holes;
        a plurality of spacer sets, a spacer set disposed between adjacent discs;
        a first end cap having a central hub and a plurality of bores arranged radially on an end of the first end cap opposite the central hub;
        a second end cap having a central hub, a plurality of bores arranged radially on an end of the second end cap opposite the central hub, and a central bore extending through the second end cap from the central hub to the end of the second end cap distal the hub;
        a plurality of rods each having a first end with a first magnet pole, and a second end with a second magnet pole; and
        the plurality of rods situated in and extending from the plurality of radial bores of and between the first and second end caps, and extending through arranged radially on the discs about their central openings with magnet poles of the rods alternating radially in polarity;
    a first annular coil housing having a plurality of coils arranged radially about the first annular coil housing, and axially adjacent the magnet poles of the ends of the rods at the first end cap, each coil having two terminals that extend from the first annular coil housing through and to the exterior of the generally cylindrical housing;
    a second annular coil housing having a plurality of coils arranged radially about the second annular coil housing, and axially adjacent the magnet poles of the ends of the rods at the second end cap, each coil having two terminals that extend from the first annular coil housing through and to the exterior of the generally cylindrical housing;
    a first bearing situated in an end of the interior of the housing and having a central bore sized to receive and rotatably retain the central hub of the first end cap; and
    a second bearing situated in an opposite end of the interior of the housing and having a central bore sized to receive and rotatably retain the central hub of the second end cap;
    whereby as the rotor assembly is rotated by pressurized fluid received into and then out from the nozzle, the magnet poles at the ends of the first and second end caps rotate relative to the fixed plurality of coils of the first and second annular coil housings respectively, such that the movement of the magnets over the plurality of coils of the first and second annular coil housings induce a flow of electricity in the plurality of coils.

2. The turbine of claim 1, wherein the nozzle is configured to provide a supersonic output in response to the input pressurized fluid.

3. The turbine of claim 2, wherein the housing opening and the nozzle output are oval.

4. The turbine of claim 3, wherein the oval housing opening is sized to provide a supersonic fluid flow from the nozzle outlet over a majority of the rotor assembly.

5. The turbine of claim 2, wherein the central openings of the discs axially align with the central bore of the central hub of the second end cap to define an exhaust outlet of the turbine.

6. The turbine of claim 2, wherein the turbine is configured to generate alternating current electricity.

* * * * *